United States Patent [19]
Formby

[11] 3,809,921
[45] May 7, 1974

[54] PHASE IDENTIFIER ASSEMBLY FOR ENDLESS CONVEYOR CONTROL APPARATUS

[75] Inventor: John Albert Formby, Moseley, England

[73] Assignee: John Formby & Company, Limited, Birmingham, England

[22] Filed: Sept. 23, 1970

[21] Appl. No.: 74,933

Related U.S. Application Data
[63] Continuation of Ser. No. 747,561, July 25, 1968, abandoned.

[52] U.S. Cl.............. 307/116, 307/117, 200/33 C
[51] Int. Cl...................... H01h 35/00, H01h 43/00
[58] Field of Search.......... 187/29; 200/33 C, 38 R, 200/38 B, 35 R, 153 R; 317/116, 117, 132 R, 141.8, 198/42, 67–70

[56] References Cited
UNITED STATES PATENTS

| | | | |
|---|---|---|---|
| 3,691,398 | 9/1972 | Burch | 307/116 |
| 1,964,909 | 7/1934 | Garity | 200/33 CX |
| 2,258,253 | 10/1941 | Levoy | 200/33 C |
| 2,437,168 | 3/1948 | Marihart | 200/33 C X |

FOREIGN PATENTS OR APPLICATIONS
1,249,462   10/1971   Great Britain

Primary Examiner—James R. Scott
Attorney, Agent, or Firm—D. Paul Weaver

[57] ABSTRACT

A phase identifier for the purpose of identifying an arbitrarily chosen phase of the cyclical movement of a conveyor, as represented by a loop of chain or the like, comprises a plurality of wheels positively driven by the loop at different speeds, but such that the speed of one wheel is a non-integral multiple of the speed of the slowest, so that any set of orientations of the wheels repeats periodically to define a cycle, greater than the cycle of any individual wheel, which cycle is made equal to the conveyor loop cycle by adjustment of the length of the loop. Associated with each wheel is a dowel adapted to operate a switch, and power is applied to the switches in series to give rise to an electrical signal at one phase of the phase identifier cycle and, consequently, at any arbitrary phase of the loop cycle. Two such identifiers in relation to one loop cause on-loading of a consignment at any prescribed point of the conveyor and off-loading of the same consignment at any other prescribed point. A multiplicity of phase identifiers are adapted to effect multiple conveyance of consignments from a set of on-loading points to a set of off-loading points within one cycle of the conveyor movement.

7 Claims, 6 Drawing Figures

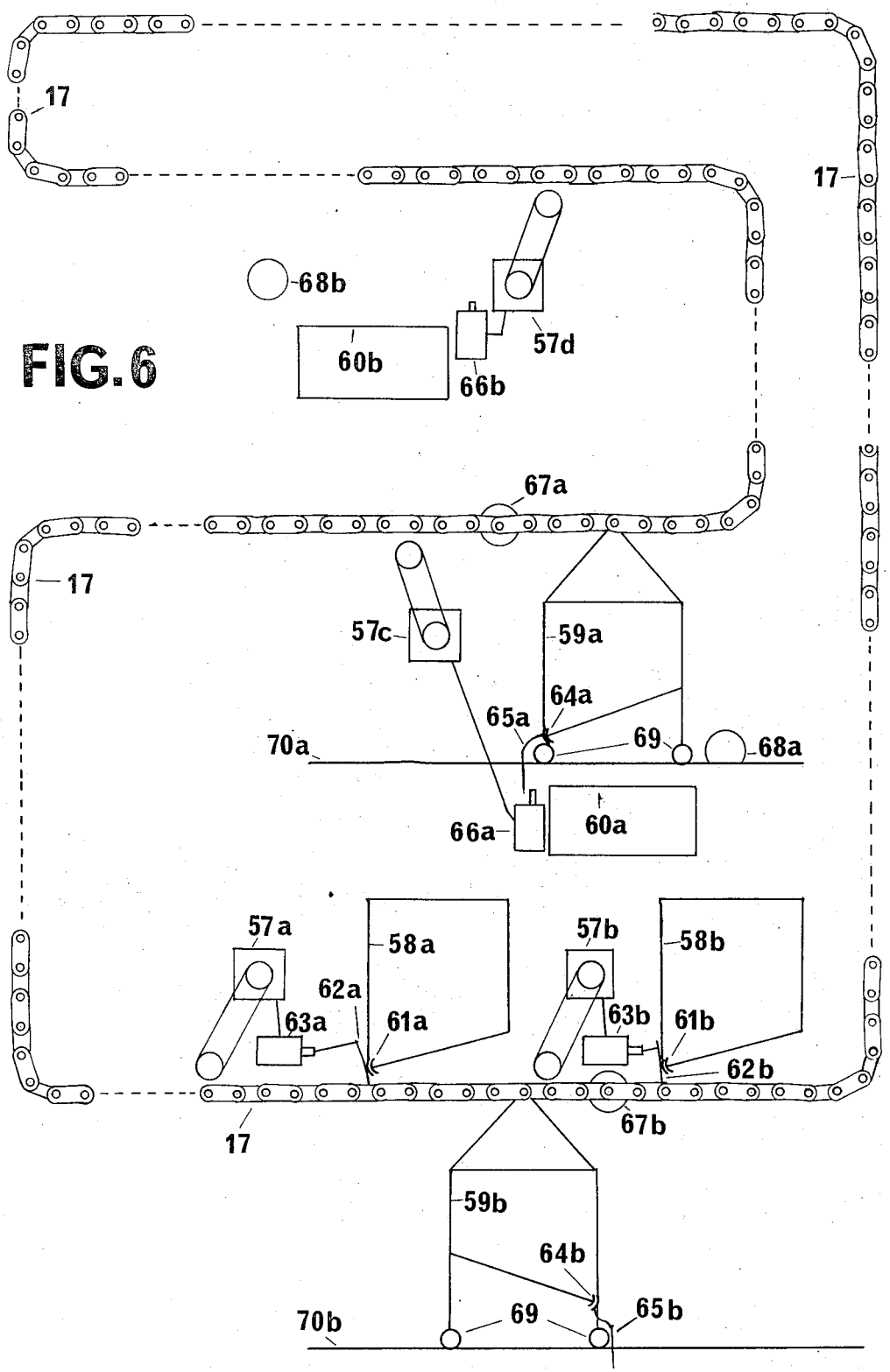

PHASE IDENTIFIER ASSEMBLY FOR ENDLESS CONVEYOR CONTROL APPARATUS

This application is a continuation of my application, Ser. No. 747,561 filed July 25, 1968, now abandoned for Control Apparatus. This invention relates to control apparatus and, in particular, to apparatus for coordinating the timing of on-loading and off-loading of consignments in relation to a cyclical conveyor having a multiplicity of on-loading and off-loading points.

A primary object of the invention is to provide a basis for an automatic conveyor for use in a tall building, with many floors, so that consignments may be deposited in individual receptacles on the ground floor and, thereafter, delivered to appropriate delivery stations on upper floors.

A second object is to provide for delivery of materials in a factory from several stores to any one consumption point and from any one store to several consumption points, by means of a single conveyor loop.

A third object is to provide a continuously operating automatic transportation system extending over several miles.

In the present state of the art of automatic conveying, consignments may be placed on a conveyor at arbitrary instants of time and devices be provided to determine, in relation to each such arbitrary instant, when the appropriate off-loading device shall operate in order to effect delivery at the appropriate point. Such systems have two major disadvantages. First, it is necessary to provide a set of communication channels from the on-loading point to the several off-loading points. This necessity is avoided by my invention, as will appear. The second disadvantage of the present art is that selection of the appropriate delivery station, in each instance, must be effected by pressing an appropriate button or the like from amongst a number of buttons, a procedure calling for a high degree of concentration on the part of the operator. This necessity is overcome in the present invention by requiring the operator only to place each consignment in an appropriate posting box. It is the timing of the automatic on-loading to the conveyor from this posting box that determines the delivery point at which the consignment will be off-loaded.

The present invention provides a means for identifying any arbitrarily chosen phase of the movement of a cyclical conveyor by causing an electrical signal to occur when that phase is attained, in the course of the motion of the conveyor. The consequences of successful realization of this concept are far reaching. in particular, one phase identifier may be used to effect the on-loading of a consignment on to a conveyor at any chosen point, while a second like identifier may be used to effect the off-loading of the same consignment at any other selected point. Thus, cooperation between an on-loading mechanism and an off-loading mechanism, in relation to the same consignment, is achieved without the need for a channel of communication between the on-loading and off-loading mechanisms. Moreover, there may be a multiplicity of phase identifiers providing for a plurality of consignments to be conveyed each from its own on-loading point to its own appropriate off-loading point, within a single cycle of the conveyor movement.

According to the invention control apparatus for the purpose of identifying any arbitrarily chosen phase of the motion of a cyclical conveyor comprises a phase identifier consisting of a plurality of wheels, each wheel being associated with distinct means to operate switching means at one phase of the rotary motion of the said wheel, the wheels being adapted to be driven at different speeds, but in positive relation to each other, the speed of one wheel being a rational non-integral multiple of the speed of the slowest wheel (or slower wheel is there are only two wheels), whereby any set of orientations of the said wheels repeats periodically, the period being greater than the period of any individual wheel, to define a cycle of the phase identifier, the said means to operate switching means being adapted to be simultaneously operative at one phase of the said cycle to operate switching means and means thereby to produce an electrical signal when that phase is attained, in combination with a material loop adapted to represent the cyclical movement of the conveyor and to support a positive drive, means to drive the phase identifier positively in relation to the said loop, the length of the loop being such that the phase identifier returns to its initial state after one cycle of the loop, and means to adjust the said one phase of the phase identifier relative to the said loop in order that the electrical signal may identify, by its timing, an arbitrarily chosen phase of the motion of the conveyor.

According to an example of the invention a phase identifier is driven positively from a planar loop of chain by means of an auxiliary loop of chain and sprockets. Examples are given below in which it is shown that choice of the numbers of teeth of the wheels of the phase identifier associated with means to operate switching means, together with the numbers of teeth of the driving wheels and also of the sprockets forming part of the drive from the main chain determines the number of links which the main chain loop must have in order that its cycle shall be exactly the same as the phase identifier cycle. While it is obviously desirable that the chain loop should be of such a length, there are circumstances in which the chain loop could be twice this length (or other integral multiple), since, although an electrical signal occurring within the loop cycle would no longer identify a phase of the chain cycle uniquely, it could still perform an effective function in carrying out the purpose of the invention.

A simple form of my invention provides two wheels, each bearing a dowel on its face and being associated with a microswitch which is closed by the dowel at one particular orientation of the wheel. The wheels are so orientated that initially both microswitches are closed simultaneously. Power is supplied to the two microswitches in series to provide an electrical signal only when both microswitches are closed. The wheels are driven at different speeds but such that neither speed is an integral multiple of the other. Thus, each of the microswitches closes periodically, as the wheels are driven, and an electrical signal occurs periodically with a period greater than the period of either wheel, so that a cycle is generated with a period greater than that of an individual wheel and an electrical signal occurs at a unique phase of that cycle.

Ideally, the phrase "unique phase" implies that power is transmitted only for an infinitesimal interval of time. In practice, it is necessary that the power should be transmitted for a finite time: the expression "unique phase" is to be understood in this sense. Having regard to the fact that each microswitch remains closed for a finite time, it may happen that although there is only one point of the cycle at which both microswitches close and open in exact unison, there may be other points at which they close and open almost in unison. This may give rise to spurious and unwanted control signals at other phases of the chain cycle. This difficulty may be avoided by providing a third wheel, with dowel and associated microswitch, driven from the same source as the other two but at a different speed from either, the three microswitches being all connected in series with a power source. The effect of the third microswitch is to avoid any spurious control signals by breaking the circuit at phase points where these unwanted signals might otherwise occur while permitting the microswitch contacts to remain closed long enough to permit power to be transmitted effectively to energise such apparatus as a lamp or a solenoid. A further modification is to provide four or five or even more dowel bearing wheels each with its associated microswitch, all the wheels being designed to rotate at different speeds, the microswitches being all connected in series. Thus, by suitable choice of the numbers of teeth of the various wheels, the phase identifier may be designed to have a very large cycle in terms of the cycle of the slowest dowel bearing wheel, and thus be suitable to a loop of many miles in length, as might be the basis of a regional transport system.

In order that the invention may be more clearly understood, it will be described in more detail by reference to the accompanying figures.

FIG. 6 shows how four identical phase identifiers may be used in conjunction with a single conveyor loop in order to effect conveyance from each of two posting boxes to associated delivery boxes.

Figure 1:
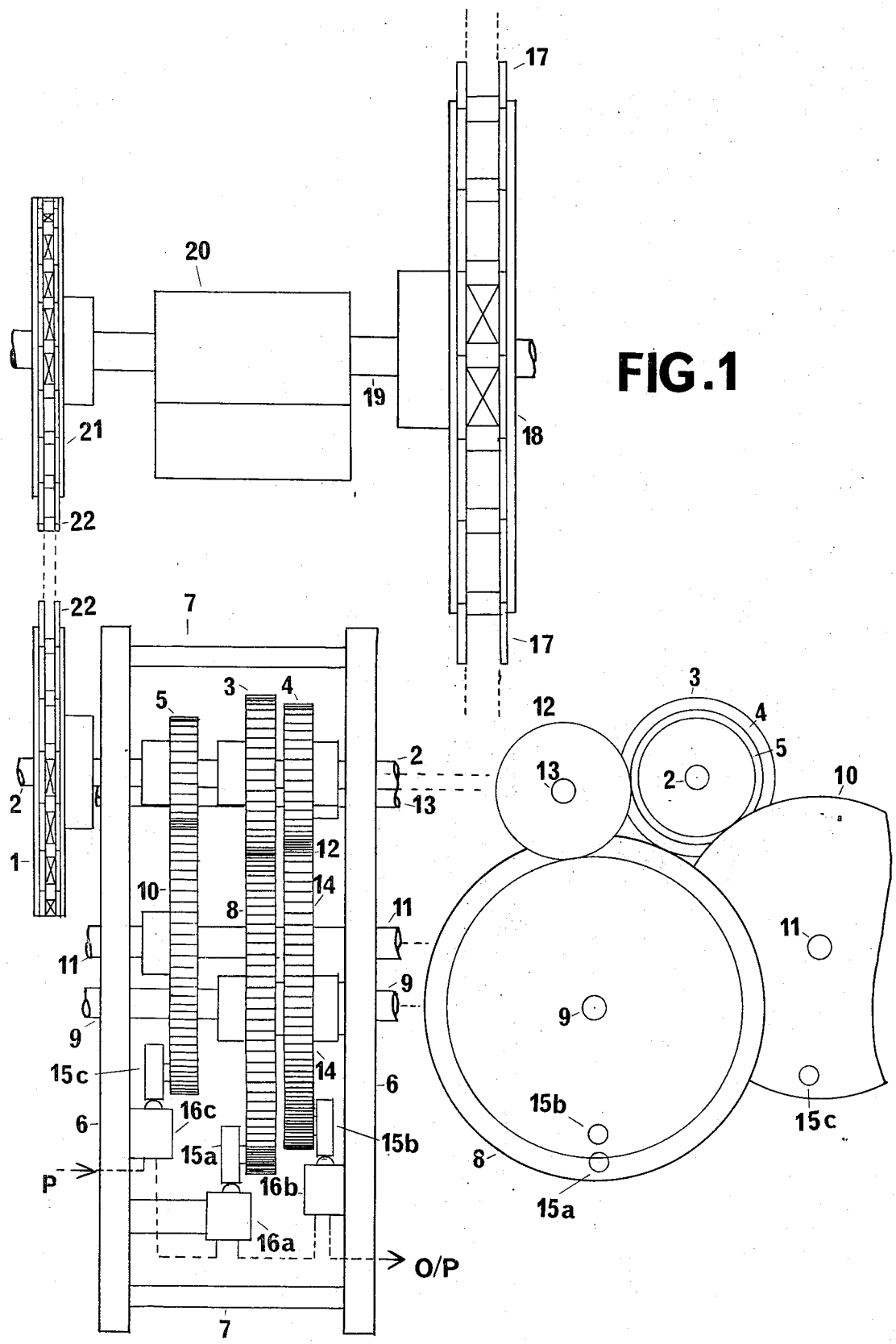
FIG. 1 shows a phase identifier with special means to avoid spurious signals, together with a portion of a loop of roller chain representing a cyclical conveyor, together with an auxiliary loop of roller chain and sprockets for the purpose of driving the phase identifier positively from the conveyor loop.

Referring to FIG. 1 a chain sprocket 1 with eighteen teeth is mounted on a shaft 2 bearing spur gear wheels 3, 4 and 5 having fiftyfive teeth, fortyeight teeth and fortyfive teeth respectively. The said shaft 2 is mounted in bearings in a framework comprising plates 6 with spacers 7. The wheel 3 engages a spur gear wheel 8 with one hundred and twenty teeth mounted on a shaft 9 and the wheel 5 engages a spur wheel 10 with ninetyfive teeth mounted on a shaft 11. The wheel 4 drives a spur wheel 12 mounted on the shaft 13 and the said spur wheel 12 drives a spur wheel 14 having ninetysix teeth and mounted on a bearing on the shaft 9 aforesaid, so that the wheel can rotate at a different speed from the shaft. Each of the said wheels 8, 10 and 14, being the final wheels of their trains bears a short dowel pin on which is mounted a small ball bearing, the assemblies being indicated by 15a, 15b and 15c respectively. Each ball bearing is adapted to operate one of three microswitches 16a, 16b and 16c which are connected in series with a power supply, indicated by "P" so that power is transmitted to the point marked "O/P" only when all three microswitches are closed. A portion of a loop of chain 17 is shown, driving a sprocket 18 with eighteen teeth mounted on a shaft 19 supported by a bearing 20. Also mounted on the shaft 19 is a sprocket 21 with eighteen teeth which drives a small auxiliary loop of chain 22, which drives the sprocket 1 aforesaid.

The chain loop 17 has exactly 8208 links so that in one complete cycle it causes the shaft 2 to turn through 456 revolutions and the wheels 8, 10 and 14 to turn through 209, 216 and 228 revolutions respectively. The said final wheels are so mounted on their shafts initially that all three ball bearings operate their respective microswitches simultaneously. As the chain loop 17 rotates through a complete cycle, there is only one phase of the cycle at which all three microswitches are operated simultaneously, although the contacts may remain closed for a small interval of time, long enough to permit an effective electrical signal to be emitted through them. The number of links in the chain 17 is determined in terms of the numbers of teeth of the wheels 3, 5, 8, 10 aforesaid by the fact that the wheels 8 and 10 return to their initial positions after exactly one cycle of the chain, as does wheel 14, which is provided to avoid spurious signals. In this connection, the number of teeth in the sprockets 1 and 21 is not important, provided they are equal. However, in order to accommodate different lengths of the chain loop 17 to the same phase identifier, it is possible to replace sprocket 21 by one of seventyone teeth and sprocket 1 by one of seventytwo teeth. The effect of this is to reduce the length of the chain loop 17 by a factor of 1/72 or 114 links. Likewise, any convenient number of teeth other than seventyone may be used so that the chain loop may be varied in length in units of 114 links. Assuming half-inch links, this means that the chain loop need differ by no more than 28½ inches from a desired normal length. But also, by changing nominal number of teeth of the sprocket 18 from eighteen to twentyfour a new series of lengths of the chain 17 may be accommodated to the same phase identifier. Thus, a suitable length can be found not differing by more than 9½ inches from a desired nominal length. The particular numbers of teeth in the various wheels as described with reference to this figure are by way of example only. It will be evident to persons skilled in the use of gears that many different combinations are possible in order to suit a desired nominal length of chain, it being understood that there is no possibility of suiting every desired length of loop exactly.

The effect of wheels 4 and 14 aforesaid is to prevent unwanted electrical signals, and in many cases they may be unnecessary. These unwanted signals could otherwise occur owing to the fact that at certain other points of the loop cycle the microswitches 16a and 16b may be simultaneously closed although the wheels 8 and 10 have not returned exactly to their initial positions. The phases at which this is most likely to occur are after approximately 1, 30, 60, 90, 120, 150, 180 and 208 revolutions of the wheel 8. The ratio of the numbers of teeth of the wheels 4 and 14 is such that in all these phase neighborhoods the microswitch 16c will have its contacts open. Thus, an electrical signal can occur at only one phase of the cycle of the chain 17. The phase at which this occurs may conveniently determined by removing the auxiliary loop 22, turning the chain loop 17 to the desired position and then replacing the said auxiliary loop 22.

Figure 2:
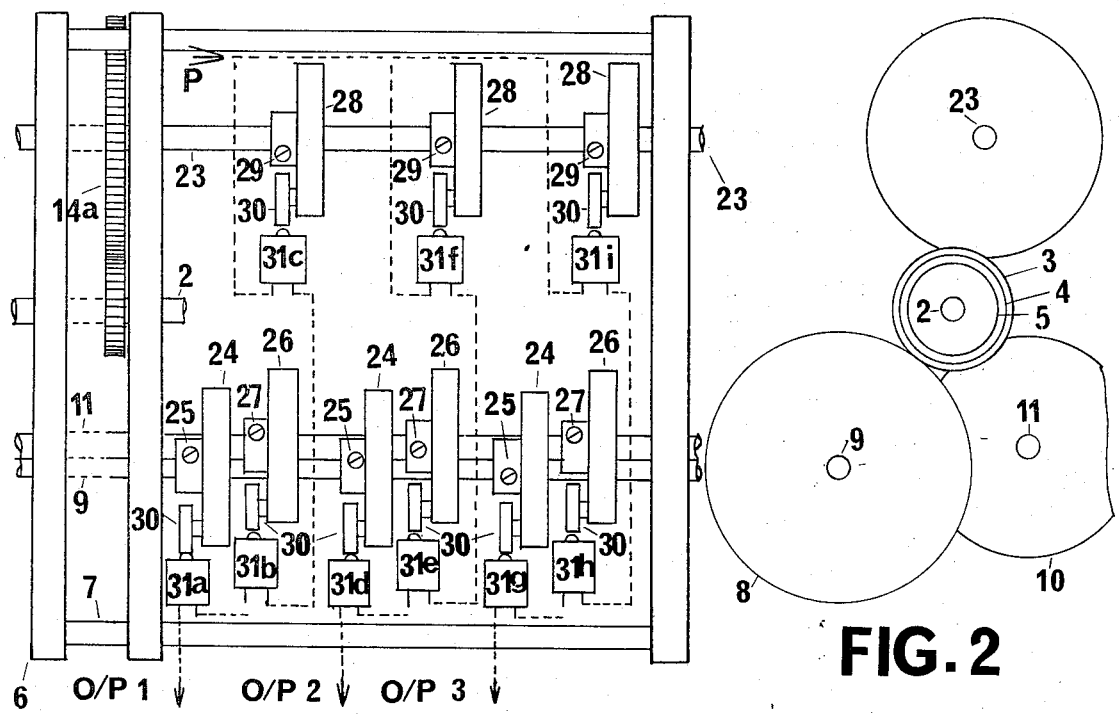
FIG. 2 shows a modification of the phase identifier of FIG. 1 in which several signals are emitted along distinct channels at arbitrarily determined phases of a single cycle of the conveyor loop.

Referring to FIG. 2 a modification of the apparatus of FIG. 1 is shown in which several signals are emitted along several distinct channels at predetermined phase points. In this modification the various spur gears of FIG. 1 are all mounted as in that figure with the exception that gear 12 and its shaft 13 are omitted and spur gear 14 is replaced by a similar gear 14a mounted on a shaft 23. Thus, shafts 2, 9, 11, and 23 are shown in FIG. 2. Mounted on the shaft 9 are a set of bossed discs 24 which may be set on the shaft at any desired orientations by means of set screws 25. Likewise on shaft 11 are three discs 26, with set screws 27 and on shaft 23 are bossed discs 28 with associated set screws 29. All these discs bear a dowel pin on which is mounted a small ball bearing, the assemblies being denoted by 30. These ball bearings are suited to operate the microswitches 31a, 31b, 31c, 31d, 31e, 31f, 31g, 31h, and 31i. The microswitches 31a, 31b, 31c are connected in series with a power supply denoted by "P" so that the power, or electrical signal, is brought to the point "O/P 1" when all three microswitches are simultaneously closed. The associated discs are so orientated on their respective shafts that, in fact, all three microswitches can be closed simultaneously. In a similar manner microswitches 31d, 31e and 31f are connected in series with "P" and "O/P2" and the microswitches 31g, 31h and 31i are connected in series with "P" and "O/P3". Thus, an electrical signal is emitted through each trio of series-connected microswitches at a distinct phase of the cycle and these phases may be chosen quite arbitrarily with respect to each other by adjustment of the set screws aforesaid. Any number of such trios may be provided: it is purely for convenience that only three are shown.

Figure 3:
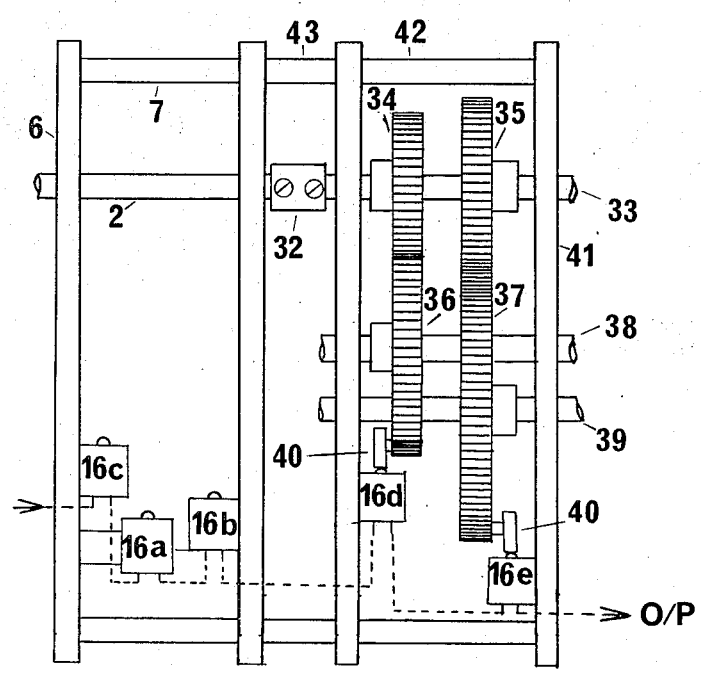
FIG. 3 shows a phase identifier suited to a very long conveyor loop extending over several miles, having five microswitches in series.

Referring to FIG. 3 an extension of the apparatus of FIG. 1 is shown, adapted to suit a very long chain loop. The shaft 2 of FIG. 1 is joined by a coupling 32 to a shaft 33 on which are mounted two spur gears 34 and 35 having fortyeight and sixty teeth respectively. These engage spur gears 36 and 37 having eightyfour and eightyfive teeth respectively, mounted on shafts 38 and 39. Each of the said wheels 36 and 37 bears a dowel and ball bearing assemby 40, adapted to operate microswitches 16d and 16e respectively. The said shafts 38 and 39 are mounted in bearings in plates 41 separated by spacers 42 and connected to the frame 6 of FIG. 1 by spacers 43. The microswitches 16a, 16b, 16c of FIG. 1 are connected in series with microswitches 16d and 16e so that power is brought to the point "O/P" only when all five microswitch contacts are simultaneously closed. Thus, when the shaft 2 turns through 456 revolutions the shafts 38 and 39 turn through 4/7 of 456 and 12/17 of 456 rotations respectively. Thus, the shafts 38 and 39 will have turned through an integral number of revolutions after 456 × 7 × 17 = 54,264 rotations of shaft 2. Thus, the apparatus as modified is suited to a chain loop having 976,752 links. Assuming now a pitch of six inches, this represents a loop of a little more than nine miles in length.

Figure 4:
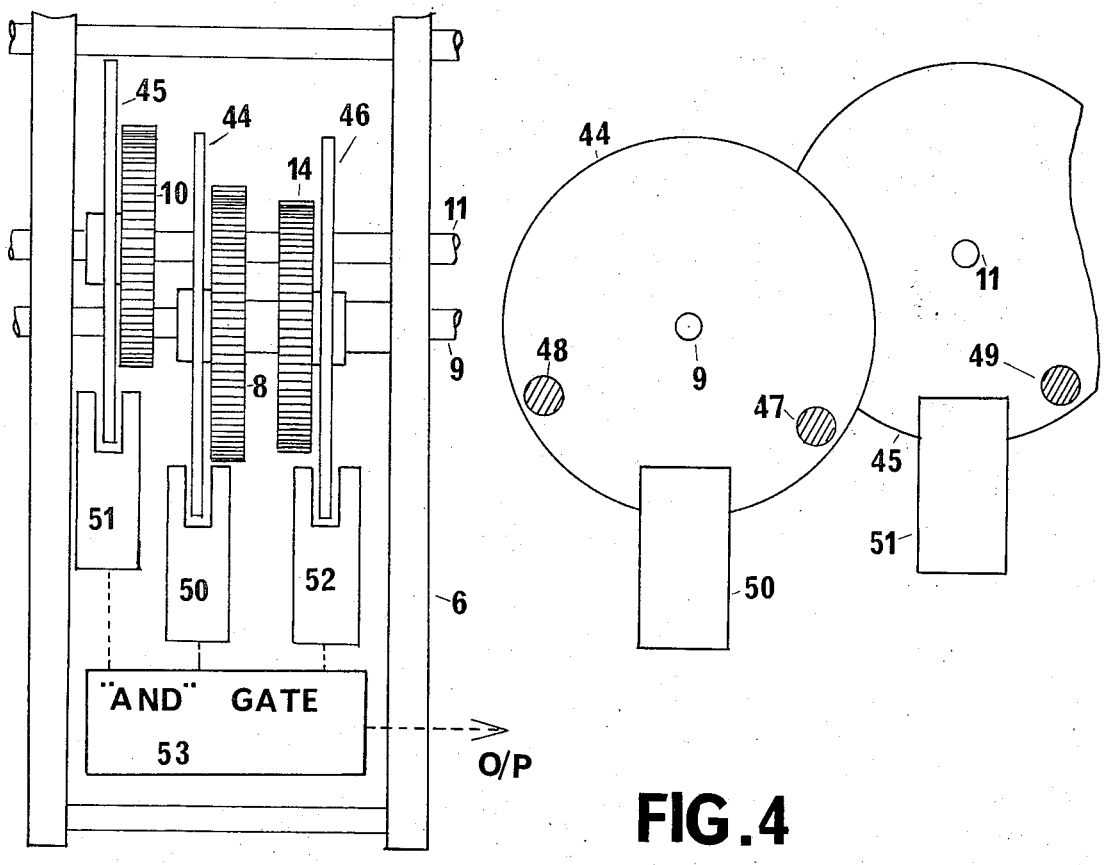
FIG. 4 shows a modified form of phase identifier in which the microswitches are replaced by electronic proximity switches in association with an "AND" gate.

Referring to FIG. 4 the spur wheels 8, 10 and 14 of FIG. 1 are shown and mounted on the bosses of these wheels are plastic discs 44, 45 and 46 having metal inserts in the form of smaller discs 47, 48 and 49 mounted near the periphery. These inserts are adapted to pass through slots in electronic sensing heads 50, 51 and 52. These heads are of a well known type containing a small electronic oscillator which oscillates when no metal is present in the slot, but is damped by the presence of metal in sufficient quantity in the sensitive central region of the slot. Thus, each head presents one of two voltage levels to an "AND" gate 53 according as sufficient metal is present in the slot or otherwise. The said sensing heads may be adjusted radially with respect to the discs in order to control the duration of the signals presented to the "AND" gate. Thus, with this arrangement, an electrical signal appears at the output ("O/P") of the gate at a unique phase of the chain loop cycle. This system is adapted to perform a similar function to the ball bearings and microswitches of FIG. 1.

Figure 5:
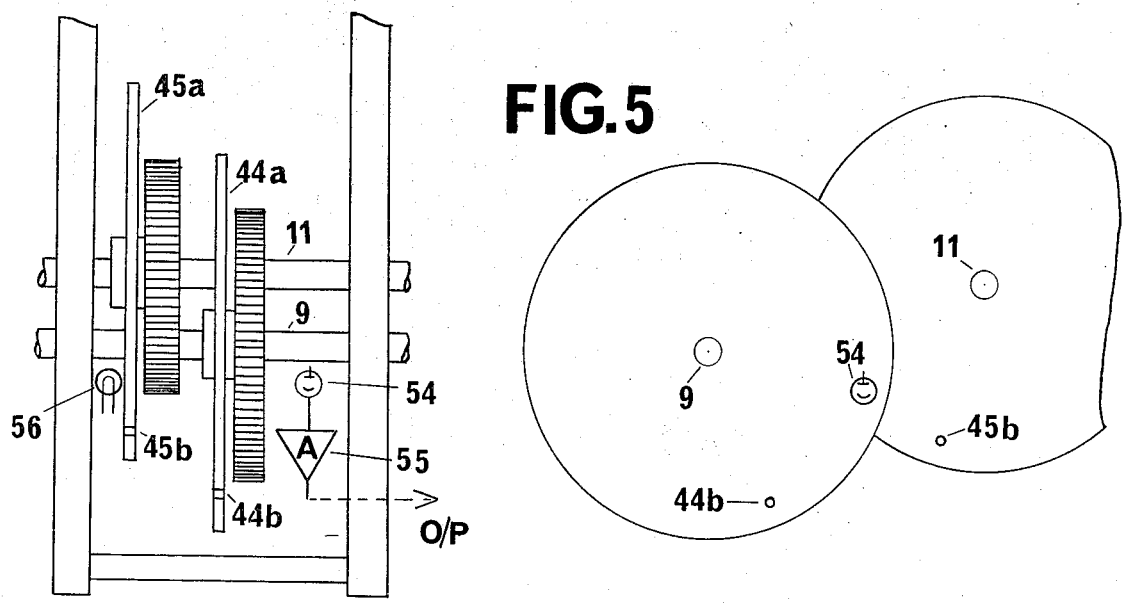
FIG. 5 shows another modified form of phase identifier in which the microswitches are replaced by photoelectric means for providing an output signal.

Referring to FIG. 5, a further modification is shown in which the electronic sensing heads of FIG. 4 are replaced by photoelectric means. Since the photoelectric method affords extreme precision, it is possible to dispense with the gear 14. Accordingly, the figure shows opaque discs 44a and 45a mounted on the bosses of spur wheels 8 and 10, the said discs having small holes 44b and 45b which can be brought into line with a photodiode 54 when the discs are suitably orientated. The output of this diode is applied to a suitable amplifier 55 and hence to the point "O/P". On the other side of the discs is a light source 56, so placed that the diode, the holes and the said light source can all be brought into line. When they are in line light reaches the photodiode and an electrical signal is provided at "O/P", but not otherwise. This system is adapted to perform a similar function to the electronic sensing heads and the "AND" gate of FIG. 4.

Referring to FIG. 6, the loop of chain 17 represented, in part, in FIG. 1 is shown. Four phase identifiers 57a, 57b, 57c and 57d are shown symbolically. Each, together with the portion of the chain loop 17 in its immediate neighbourhood comprises all the elements of FIG. 1. The said loop is adapted to be driven in a clockwise direction and each phase identifier may be set independently to provide an electrical control current at any desired phase of the said loop cycle. In order that the purpose of the invention may be explained more clearly, two static posting boxes 58a and 58b are shown, together with two carriers 59a and 59b and two delivery boxes 60a and 60b. The said posting boxes are fitted with hinged bases retained in the closed position by ball catches 61a and 61b, comprising ball units in the bases and sockets on spring loaded arms 62a and 62b attached at their lower ends to the frames of the boxes and at the upper ends to the plungers of solenoids 63a and 63b. These solenoids are energised via the O/P points of the phase identifiers 57a and 57b. Thus, the identifier 57a is so set that when the carrier 59a is immediately below the posting box 58a the solenoid 63a is energised to unlatch the base of the said posting box and so cause the contents to fall into the carrier 59a. Likewise, the contents of the box 58b are caused to fall into the carrier 59b. The said carriers are likewise provided with hinged bases, with ball catches 64a and 64b, the sockets being mounted on spring loaded arms 65a, 65b which are rigidly attached to the carriers at the upper ends and are free at the lower ends. The delivery boxes 60a, 60b have alongside them thruster solenoids 66a and 66b, energised respectively via the O/P points of phase identifiers 57c and 57d. The identifier 57c is set to energise the solenoid 66a when the carrier 59a appears above the delivery box 60a. Thus, the hinged base is unlatched and the contents of the carrier are deposited in the said delivery box. Likewise, the contents of carrier 59b are deposited in delivery box 60b. Thus, the effect is to convey the contents of posting boxes 58a and 58b to delivery boxes 60a and 60b respectively. The bases of the posting boxes are reset by rollers 67a, 67b carried by the chain 17 and the bases of the carriers are reset by rollers 68a and 68b in fixed positions.

For practical reasons it is desirable to provide two loops of chain, although, for simplicity, only one is shown here, and for the carriers to be slung between them. The carriers are also provided with small wheels 69 which are supported on platforms during the horizontal parts of their motions. The drawing depicts three different floor levels of a building and the situation is shown where the posting box 58a has deposited its contents in carrier 59a and has been reset by roller 67a. The said carrier is shown with its wheels supported on a platform 70a at first floor level and about to be unlatched by the solenoid 66a, so that the contents will be deposited into delivery box 60a. The carrier base will then be reset by roller 68a. The post box 58b has deposited its contents into carrier 59b and has been reset by roller 67b, the said carrier being supported by platform 70b at ground level. The said carrier 59b will be conveyed to the second floor level before being unlatched by solenoid 66b so that the contents are deposited in delivery box 60b. The carrier will then be reset by roller 68b.

The phase identifiers of this figure, which are understood to be as in FIG. 1 may be replaced by the modified identifiers of FIG. 2. In this case, after a posting box has deposited its contents into a carrier, as described, it may be refilled and the new contents deposited into a second carrier which may move to a second delivery box before being unlatched. Thus, a single posting box may unload its contents on successive occasions into a succession of carriers so that the various consignments are distributed to a multiplicity of delivery boxes. Alternatively, the contents of several posting boxes may be conveyed to a single delivery box.

The above details of the operation of a conveyor are by way of example only, and it is not intended to restrict the invention to a planar loop of chain, since it could equally be three dimensional, or to any particular type of chain or the like. Also, conventional means may be employed to start the conveyor in motion, to drive it and bring it back to rest in its original position after exactly one cycle.

I claim:

1. Control apparatus for the purpose of identifying any arbitrarily chosen phase of the motion of a cyclical conveyor comprising, in combination: a phase identifier consisting of a plurality of wheels; switching means; distinct means being respectively associated with each of said wheels to operate respective switching means at one phase of rotary motion of the said wheel; said wheels being adapted to be driven in positive relation to each other at different speeds, the speed of one of said wheels being a rational non-integral multiple of the speed of the slowest wheel whereby any set of orientations of said wheels defining a phase repeats periodically, the period of a orientation being greater than the period of any one of said wheels to define a cycle of said phase identifier, said distinct means to operate respective switching means being arranged to operate simultaneously at one phase of the cycle; means coupled to said switching means to produce an electrical signal when the one phase is attained; a material loop adapted to represent the cyclical movement of the conveyor and to support a positive drive; and means to drive the phase identifier positively in relation to said material loop, the length of said material loop being adjustable so that one cycle of said loop corresponds to one cycle of said phase identifier, whereby said phase identifier may be adjusted relative to said material loop such that the electrical signal identifies an arbitrarily chosen phase of the motion of the conveyor.

2. Control apparatus according to claim 1, wherein the cyclical movement of the conveyor is represented by a planar loop of roller chain, the number of links in the chain being adjustable so that the chain loop may execute one cycle in exact synchronism with the phase identifier cycle.

3. Control apparatus according to claim 1, wherein a pair of phase identifiers having cycles of equal period function in relation to a conveyor loop, with means to apply the electrical signal of one identifier to on-load a consignment and means to apply the electrical signal of the second identifier to off-load the same consignment.

4. Control apparatus according to claim 1 with means to provide a multiplicity of electrical signals each at an arbitrarily chosen phase of the loop cycle and at a distinct output point.

5. Control apparatus according to claim 1, wherein the wheels are spur gear wheels, the means to operate switching means are ball bearings mounted on dowel pins, each mounted on the face of a spur gear wheel, each said spur gear wheel being the final wheel of a train of spur gear wheels, all the trains being driven from a common input shaft, the switching means are microswitches and an electrical signal is provided whenever the microswitches, connected in series, are simultaneously closed.

6. Control apparatus according to claim 1, wherein the means to operate switching means are rotary means adapted to bear metal parts transversely through gaps in electronic sensing heads and an electrical signal is provided through the medium of an "AND" gate when the sensing heads are simultaneously operative.

7. Control apparatus according to claim 1, wherein the means to operate switching means are opaque discs, each with a small hole, and switching means comprises a photodiode on which light may fall to activate it effectively only after passing through a hole in each disc, the holes being in alignment, and an electrical signal is provided by an amplifier when the photodiode is so activated.

* * * * *